United States Patent
Christensen et al.

(10) Patent No.: US 12,250,508 B2
(45) Date of Patent: Mar. 11, 2025

(54) METHOD, CHARGING SYSTEM AND COMPUTER PROGRAM PRODUCT FOR CHARGING A BATTERY OF A HEARING INSTRUMENT

(71) Applicant: Oticon A/S, Smørum (DK)

(72) Inventors: Jess Christensen, Smørum (DK); Atli Gilbert Sigurdsson, Smørum (DK)

(73) Assignee: Oticon A/S, Smørum (DK)

( * ) Notice: Subject to any disclaimer, the term of this patent is extended or adjusted under 35 U.S.C. 154(b) by 620 days.

(21) Appl. No.: 17/566,216

(22) Filed: Dec. 30, 2021

(65) Prior Publication Data

US 2022/0225005 A1 Jul. 14, 2022

(30) Foreign Application Priority Data

Jan. 14, 2021 (EP) .................................. 21151595

(51) Int. Cl.
*H04R 1/10* (2006.01)
*H02J 7/00* (2006.01)

(52) U.S. Cl.
CPC .......... *H04R 1/1025* (2013.01); *H02J 7/0071* (2020.01); *H02J 7/007186* (2020.01); *H02J 2310/22* (2020.01); *H04R 2225/31* (2013.01)

(58) Field of Classification Search
CPC .................................................... H04R 1/1025
USPC ......................................................... 320/137
See application file for complete search history.

(56) References Cited

U.S. PATENT DOCUMENTS 9,923,395 B2 * 3/2018 Sudan ................ G01R 31/3842
11,431,185 B1 * 8/2022 Feng ...................... H02J 7/007
2004/0113591 A1 6/2004 Bradley et al.
2005/0259838 A1 11/2005 Barthel et al.
2012/0190305 A1 7/2012 Wuidart
2014/0320089 A1 10/2014 Wang et al.
2016/0064960 A1 3/2016 DiCarlo et al.
2017/0064429 A1 * 3/2017 Hirsch .............. H04W 52/0254
2017/0339482 A1 * 11/2017 Schrems ................. H02J 50/10

FOREIGN PATENT DOCUMENTS

WO WO 2017/144110 A1 8/2017

OTHER PUBLICATIONS

European Search Report, issued in EP Application No. 21151595.2, dated Jul. 8, 2021.

* cited by examiner

*Primary Examiner* — Jerry D Robbins
(74) *Attorney, Agent, or Firm* — Birch, Stewart, Kolasch & Birch, LLP (57) ABSTRACT

A method for charging a battery of a hearing instrument is disclosed. The method may comprise obtaining (110) a discharge function as a relationship between a battery charge and a voltage of the battery. The method may further comprise obtaining (112) a desired runtime capacity to be achieved by charging the battery. The method may further comprise determining (114) a charging voltage taking into account at least the discharge function and/or the desired runtime capacity. The method may further comprise charging (116) the battery with the determined charging voltage. The method may improve battery longevity while at the same time ensuring that a desired runtime capacity is provided. Furthermore, a charging system (200) for charging a battery of a hearing instrument and a computer program product are disclosed.

15 Claims, 6 Drawing Sheets

METHOD, CHARGING SYSTEM AND COMPUTER PROGRAM PRODUCT FOR CHARGING A BATTERY OF A HEARING INSTRUMENT

FIELD

The present disclosure relates to a method, a charging system and a computer program product for charging a battery. More particularly, the disclosure relates to a method, a charging system and a computer program product for charging a battery of a hearing instrument.

BACKGROUND

A hearing instrument, like for example a hearing aid, usually has one or several rechargeable batteries to supply electric power to the hearing instrument. These batteries store electric charge and provide an electric voltage depending on the amount of stored charge. When a battery is connected to an external electric load, like for example electric components of a hearing instrument, the battery voltage produces an external electric current draining the stored charge, so that electric power is supplied to the load.

An important property of a battery is its battery capacity. Within the present disclosure, the battery capacity is to be understood as the maximum amount of electric charge that can be stored in a battery if the battery is charged to a maximum charge voltage that is usually determined by the electrochemical processes occurring inside the battery. Therefore, the battery capacity is expressed in units of electric charge, for example in mAh. In general, the battery capacity decreases with increasing age of a battery. Whereas the battery usually has its highest battery capacity in or close to a factory-new state, the battery capacity decreases over time, eventually reaching a point where the battery can no longer be used and has to be replaced. In the case of hearing instruments, replacing a rechargeable battery is often a labor- and cost-intensive operation because typically, the hearing instrument has to be opened. This requires trained personnel and specialist equipment, and thus the customer has to send in the hearing instrument to the manufacturer or visit a specialist store. Therefore, the point when the battery of a hearing instrument has to be replaced, should be delayed as much as possible in order to provide satisfactory user experience.

In the fully charged state of a battery, the charge stored in the battery is equal or at least approximately equal to its battery capacity. As the electric power supplied by the battery is consumed by an external load, for example by electric components of the hearing instrument, the battery is discharged, i.e. the charge stored in the battery reduces. In order to maintain the supply of electric power, the battery has to be recharged regularly. Otherwise, the battery reaches an empty state where it can no longer supply sufficient electric power. In the case of hearing instruments, this empty state leads to the function of the hearing instrument being no longer available to the user and should therefore be avoided as much as possible.

Methods for charging a rechargeable battery of a hearing instrument are known in the state of the art. Typically, these conventional methods involve charging the battery always to the fully charged state. This requires a high charging voltage, more specifically the above-mentioned maximum charge voltage, and has a negative effect on the longevity of the battery. Within the present disclosure, longevity is to be understood as the number of battery user cycles before the battery capacity reaches a value below a minimum acceptable battery capacity. It has been found that major parts of battery wear are not due to actual charge and discharge cycles, but rather caused by other factors such as exposure to high voltages, adverse temperature, and to some extend deep discharges. Therefore, it becomes apparent that charging a battery in a conventional way using always the maximum charge voltage significantly reduces longevity, so that the battery has to be exchanged more often. In the case of hearing instruments, this causes dissatisfactory user experience, as already explained above. Another approach in order to achieve a high longevity involves operating the battery in a recommended limited operation range with respect to state of charge, such as between 30% and 80%, where state of charge is to be understood as the battery level, expressed as a percentage above being empty.

Against this background, there is a need to provide solutions for charging a battery of a hearing instrument such that the battery longevity can be improved. The present disclosure provides such solutions.

SUMMARY

According to a first aspect, a method for charging a battery of a hearing instrument is disclosed. The method may comprise obtaining a discharge function as a relationship between a battery charge and a voltage of the battery, such as an open circuit voltage of the battery, or a discharge voltage of the battery (that can also be called closed circuit voltage of the battery).

Within the present disclosure, the term battery charge is to be understood as any suitable quantity indicative for the electric charge stored in the battery relative to an arbitrary reference value. For example, the battery charge can be defined to be equal to the amount of electric charge stored in the battery relative to a reference value at which the battery is considered empty. As another example, the battery charge can be defined to be equal to the electric charge withdrawn from the battery relative to a reference value at which the battery is considered fully charged. However, other ways to define a battery charge relative to different reference values are also conceivable.

Furthermore, the discharge voltage is to be understood within the present disclosure as being the battery voltage when electric load is applied.

Furthermore, the open circuit voltage is to be understood within the present disclosure as any suitable quantity indicative for the voltage provided by a battery when the battery is disconnected from any electric circuit. In other words, the open circuit voltage is to be understood as any suitable quantity indicative for the voltage provided by a battery without electric load and without external electric current flowing between the terminals of the battery. In particular, the open circuit voltage is defined to be equal to the battery voltage without electric load. However, other ways to define the open circuit voltage as a quantity indicative for the battery voltage without electric load are also conceivable. For example, the open circuit voltage may be defined as a multiple or as a fraction of the battery voltage without electric load, or it may be defined as the sum of the battery voltage without electric load and a positive or negative offset voltage.

In general, the open circuit voltage is related to the battery charge. Assuming as an example that the open circuit voltage is defined to be equal to the battery voltage without electric load, the relation is as follows: When the battery charge is indicative for the fully charged state of the battery, the open circuit voltage attains a maximum value. As the battery charge changes in such a way that it indicates a discharging of the battery relative to the fully charged state, the open circuit voltage reduces relative to the maximum value. Eventually, when the battery charge reaches a value indicating the empty state of the battery, the open circuit voltage attains a lower threshold value referred to as shutdown voltage. At this point, the battery can no longer supply sufficient electric power without being recharged.

Within the present disclosure, the relationship between a battery charge and an open circuit voltage of the battery is referred to as discharge function. Assuming again as an example that the open circuit voltage is defined to be equal to the battery voltage without electric load, the term discharge function expresses that on the one hand, a smaller value of the battery charge corresponds to a state of the battery being closer to the fully charged state and having a higher open circuit voltage, and on the other hand, a higher value of the battery charge corresponds to a state of the battery being closer to the empty state and having a lower open circuit voltage. Like this, the battery charge increases as the battery is discharged, i.e. as electric charge stored in the battery is withdrawn from the battery. However, it is likewise possible to define the relationship between the battery charge and the open circuit voltage vice versa, i.e. as a charge function. In this case on the one hand, a smaller value of the battery charge corresponds to a state of the battery being closer to the empty state and having a lower open circuit voltage, and on the other hand a higher value of the battery charge corresponds to a state of the battery being closer to the fully charged state and having a higher open circuit voltage. Like this, the battery charge increases as the battery is charged, i.e. as electric charge is stored in the battery. Within the present disclosure, the terms discharge function and charge function are fully equivalent, and any disclosure or claim relating to a discharge function shall be considered to equally relate to a charge function, too.

The discharge function can also refer to the relationship between the battery charge and a discharge voltage of the battery. The discharge function thus expresses that on the one hand, a smaller value of the battery charge corresponds to a state of the battery being closer to the fully charged state and having a higher discharge voltage, and on the other hand, a higher value of the battery charge corresponds to a state of the battery being closer to the empty state and having a lower discharge voltage.

Therefore, hereunder within the present disclosure, the term "open circuit voltage" can be replaced by the term "discharge voltage".

From a mathematical point of view, the discharge function may be represented by any suitable means. For example, the discharge function may be represented by discrete values of a battery charge and an open circuit voltage, expressed for example as a value table. As another example, the discharge function may be represented by a continuous function expressed by a mathematical equation relating a battery charge and an open circuit voltage to each other. As another example, the discharge function may be represented by discrete values, expressed for example as a value table, and at least one continuous function to obtain interpolated values in regions where no values are available from the discrete function. As another example, the discharge function may be represented by a combination of two or more of the representations explained above.

Because the method according to the first aspect may comprise obtaining a discharge function as a relationship between a battery charge and an open circuit voltage of the battery, it is possible to provide suitable information, based on which a charging voltage for charging the battery may be determined such that the battery longevity can be improved. For example, a charging voltage for charging the battery may be determined based on information from the obtained discharge function, which is lower than the above-mentioned maximum charge voltage, so that the exposure of the battery to high voltages can be reduced.

The method according to the first aspect may further comprise obtaining a desired runtime capacity to be achieved by charging the battery. Within the present disclosure, the term runtime capacity is to be understood as the available amount of electric charge stored in a battery right after finishing a charging process using a particular charging voltage. For example, if the battery is charged using the above-mentioned maximum charge voltage, the resulting runtime capacity may be equal or at least approximately equal to the battery capacity. Conversely, if the battery is charged using a voltage lower than the maximum charge voltage, the resulting runtime capacity may be lower than the battery capacity. Because the method according to the first aspect may comprise obtaining a desired runtime capacity to be achieved by charging the battery, it is possible that, even though a charging voltage lower than the maximum charge voltage may be determined for charging the battery, the desired runtime capacity can still be provided by the battery after the charging. The method according to the first aspect may further comprise determining a charging voltage taking into account at least the discharge function and/or the desired runtime capacity. In addition, the method according to the first aspect may further comprise charging the battery with the determined charging voltage. In this context, determining the charging voltage taking into account at least the discharge function and/or the desired runtime capacity means that the charging voltage is determined considering at least either the obtained discharge function or the obtained desired runtime capacity or both. In other words, the method of determining the charging voltage would not be possible if neither the obtained discharge function nor the obtained desired runtime capacity were known. Nevertheless, determining the charging voltage may also be performed taking into account quantities other than the discharge function and the desired runtime capacity. Because the method according to the first aspect may comprise determining a charging voltage taking into account at least the discharge function and/or the desired runtime capacity, and charging the battery with the determined charging voltage, an improvement of battery longevity can be achieved. More specifically, the charging voltage, which may be determined taking into account at least the discharge function and/or the desired runtime capacity, and which may be used for charging the battery, may be lower than the above-mentioned maximum charge voltage. With respect to this, the method of the first aspect is based on the finding that it is not always necessary to charge a rechargeable battery to the full battery capacity by using the maximum charge voltage. In particular, if it is foreseeable that the battery will be recharged again before reaching the empty state, it is sufficient to charge the battery to a runtime capacity which is lower than the battery capacity. Especially in the case of hearing instruments, it can be assumed that the user recharges the battery on a daily basis, in particular over night while sleeping. Since charging the battery to a reduced runtime capacity instead of the full battery capacity may be achieved using a charging voltage which is lower than the maximum charge voltage, the exposure of the battery to high voltages can be reduced, thus improving battery longevity. Nevertheless, the desired battery capacity, which may also be taken into account for determining the charging voltage, may attain a value large enough for the battery to provide enough electric power until the next regular recharging. Like this, the undesirable situation that the battery is depleted too soon and thus has to be recharged too early, which would lead to dissatisfactory user experience, can be avoided. Therefore, a particular advantage of the method according to the first aspect is improving battery longevity while at the same time ensuring that a desired runtime capacity is provided.

In the method according to the first aspect, the discharge function is preferably obtained in such a way that the obtained discharge function dynamically represents the ageing condition of the battery. Since the battery capacity generally decreases with increasing age of a battery, and therefore also the discharge function changes accordingly, this is especially advantageous in order to provide accurate information from the discharge function. In this context, obtaining the discharge function may comprise obtaining the discharge function based on measurement data of the battery. For example, the measurement data may be measurement data indicative for a battery charge and/or an open circuit voltage. In particular, the measurement data may be obtained directly from a battery of the hearing instrument. By obtaining the discharge function based on measurement data of the battery, it can be achieved that the obtained discharge function is particularly accurate in dynamically representing the actual ageing condition of the battery.

Furthermore, obtaining the discharge function may comprise obtaining the discharge function based on stored data of a sample battery. For example, a representative sample battery may be used to obtain measurement data indicative for a battery charge and/or an open circuit voltage, and this measurement data may be stored in the hearing instrument to obtain a discharge function based on the stored data. By obtaining the discharge function based on stored data of a sample battery, it can be achieved that measurement equipment for obtaining the discharge function based on actual measurement data of the battery can be omitted, thus reducing cost and weight of the hearing instrument.

Furthermore, obtaining the discharge function may comprise obtaining the discharge function based on a calculation model. For example, a calculation model taking into account the dependency of the discharge function on the ageing condition of the battery may be used. By obtaining the discharge function based on a calculation model, it can be achieved that, again, measurement equipment for obtaining the discharge function based on actual measurement data of the battery can be omitted, thus reducing cost and weight of the hearing instrument.

Furthermore, obtaining the discharge function may comprise obtaining the discharge function with the aid of an artificial neuronal network which has been trained using training data. For example, the ageing condition of the battery is determined, and a discharge function representing the specific ageing condition is obtained with the aid of an artificial neuronal network, which has been trained in advance using training data of different discharge functions corresponding to different ageing conditions. By obtaining the discharge function with the aid of an artificial neuronal network which has been trained using training data, it can be achieved that the obtained discharge function is particularly accurate in dynamically representing the actual ageing condition of the battery, and that it can be determined in a reliable way, both without requiring continuous measurement of the discharge function.

The method according to the first aspect may further comprise determining a battery capacity from the discharge function and using the determined battery capacity for determining the charging voltage. Determining the battery capacity from the discharge function may comprise determining the battery capacity in any appropriate way. For example, the battery capacity may be determined graphically, numerically, by means of calculation. However, other way to determine the battery capacity from the discharge function are also conceivable. Furthermore, using the determined battery capacity for determining the charging voltage may comprise using the determined battery capacity in any appropriate way. For example, the determined battery capacity may be compared to a desired runtime capacity, and the charging voltage may be determined according to the result of the comparison. By determining a battery capacity from the discharge function and using the determined battery capacity for determining the charging voltage, it can be achieved that determining the charging voltage can be simplified under certain circumstances. For example, if a desired runtime capacity is equal to or larger than the determined battery capacity, the charging voltage may immediately be equated with the maximum charge voltage.

In the method according to the first aspect, determining the battery capacity may further comprise determining the battery capacity as the difference between the battery charge corresponding to a predetermined maximum open circuit voltage in the discharge function and the battery charge corresponding to a predetermined shutdown voltage in the discharge function. Thereby, it is possible to reliably determine the battery capacity, or at least a sufficiently accurate approximation of the battery capacity, from the discharge function. For example, the battery charge corresponding to a predetermined maximum open circuit voltage in the discharge function may correspond to a fully charged state of the battery, and accordingly, the battery charge corresponding to a predetermined shutdown voltage in the discharge function may correspond to an empty state of the battery. Therefore, the difference between both battery charges is indicative for the maximum amount of electric charge that can be stored in a battery, i.e. the battery capacity.

In the method according to the first aspect, determining the charging voltage may further comprise:
 comparing the battery capacity and the desired runtime capacity;
 if the battery capacity is lower than or equal to the desired runtime capacity, setting the charging voltage to a predetermined maximum charging voltage;
 if the battery capacity is larger than the desired runtime capacity, setting the charging voltage to a value corresponding to the desired runtime capacity indicated by the discharge function.

In this context, it must be considered that the battery capacity may be lower than the desired runtime capacity, for example because of ageing of the battery, which reduces the battery capacity over time compared to a factory-new state. By determining the charging voltage as above, by comparing the battery capacity and the desired runtime capacity and setting the charging voltage depending on the result of the comparison, it is possible to efficiently determine an appropriate charging voltage for charging the battery as follows: On the one hand, if the battery capacity is sufficiently large to provide the desired runtime capacity after charging, the charging voltage is set to a value such that the desired runtime capacity can be provided, while at the same time the battery is charged with a voltage smaller than the maximum charge voltage, thus improving battery longevity. On the other hand, if the battery capacity is not sufficiently large to provide the desired runtime capacity after charging, at least the battery capacity as the maximum possible capacity can be provided instead. This is achieved by setting the charging voltage to a predetermined maximum charging voltage, which is in particular given by the above-mentioned maximum charge voltage of the battery. Even though the actually resulting runtime capacity is in this case smaller than the desired battery capacity, the maximum possible capacity is provided, and therefore unsatisfactory user experience caused by early depletion of the battery is at least prevented to the largest possible extent.

Another consideration is charging time and heating. Charging the battery to a significantly higher capacity than desired runtime capacity will increase charging time for the user. Furthermore, the battery temperature is increased during charging which can affect battery longevity. Consequently, it may be needed to use set the predetermined minimum voltage higher than the voltage-of-no-stress depending if there is significant overhead on the capacity of the battery.

In the method according to the first aspect, determining the charging voltage may further comprise determining the charging voltage between a predetermined maximum charging voltage and a predetermined minimum voltage-of-no-stress. In particular, the predetermined maximum charging voltage is given by the above-mentioned maximum charge voltage of the battery. By determining the charging voltage between a predetermined maximum charging voltage and a predetermined minimum voltage-of-no-stress, it is achieved that the charging voltage is not set to values which may be disadvantageous without providing additional benefits. In this context, setting the charging voltage to a value above the maximum charge voltage is no longer beneficial, because the resulting runtime capacity cannot exceed the battery capacity, but it is disadvantageous with respect to the longevity of the battery. Furthermore, a so-called voltage-of-no-stress can usually be defined for a given battery or battery type. The voltage-of-no-stress is a threshold value for the charging voltage, below which no additional benefit with respect to the improvement of the battery longevity can be achieved. However, charging the battery with a charging voltage lower than the voltage-of-no-stress has the disadvantage of lower resulting runtime capacity. Therefore, setting the charging voltage to a value below the predetermined minimum voltage-of-no-stress should only be done if there is significant overhead above desired runtime capacity.

The method according to the first aspect may further comprise obtaining an updated discharge function. This means in particular that the discharge function has been updated before obtaining it. Furthermore, the method may also comprise updating the discharge function. This means in particular that the discharge function is updated after obtaining it. Furthermore, the method may also comprise repeatedly obtaining measurement data of the battery in order to update the discharge function. By obtaining an updated discharge function, updating the discharge function, or repeatedly obtaining measurement data of the battery in order to update the discharge function, it can be achieved in each case that the discharge function is continuously updated in order to dynamically represent the ageing condition of the battery, thus allowing to provide accurate information from the discharge function.

The method according to the first aspect may further comprise storing an updated discharge function. For example, the updated discharge function is stored in order to be obtained at a later point. Thereby, it can be achieved that the updated discharge function, which dynamically represents the ageing condition of the battery, is made available for a later use.

The method according to the first aspect may further comprise using a low pass filter for updating the discharge function. In particular, an exponential moving average (EMA) filter may be used for updating the discharge function. In this context, especially if the discharge function is continuously updated, the charging voltage determined by the method according to the first aspect may fluctuate. By using a low pass filter for updating the discharge function protects the battery against erroneous updates and ensure smooth/stable runtime capacity. In addition, protection against erroneous updates can be provided.

In the method according to the first aspect, obtaining the desired runtime capacity may comprise obtaining the desired runtime capacity based on an action of the user of the hearing instrument. For example, the desired runtime capacity may be obtained based on a user input on a charging system for charging the battery of the hearing instrument. As another example, the desired runtime capacity may be obtained based on a user input in a smartphone application which communicates with either the hearing instrument or a charging system for charging the battery of the hearing instrument. By obtaining the desired runtime capacity based on an action of the user of the hearing instrument, it can be achieved that the user is able to adapt the runtime capacity to the user's use behavior, thus improving user experience.

In the method according to the first aspect, the value of the desired runtime capacity may be a predetermined value corresponding to the runtime capacity needed by the hearing instrument to be used during a day and/or a value that is less than an initial value indicating the empty state of the battery, this initial value being determined at the beginning of the battery life, for example before or at the first use of the battery.

The predetermined value can be obtained based on the user's habits that impact the duration of discharge of the battery, for example the daily number of hours during which the user wears the hearing instrument (e.g. 8 to 10 hours) and eventually at least one mode of operation of the hearing instrument.

The predetermined value can be set by the user or an audiologist or the manufacturer of the hearing instrument. The predetermined value may be input on a charging system or in a smartphone application. The predetermined value can be stored in the hearing instrument. The predetermined value can be updated based on a modification of the user's habits, for example the daily number of hours during which the user wears the hearing instrument and/or a mode of operation. An updated desired runtime capacity is therefore obtained and can be used in a subsequent implementation of the method for charging the battery The predetermined value is for example 20 mAh for a battery capable of storing 28 mAh above empty state.

The method according to the first aspect may further comprise providing the user of the hearing instrument with information about the state of charge of the battery. Within the present disclosure, state of charge is to be understood as the battery level, expressed as a percentage. For example, the state of charge is expressed as a percentage in such a way that 0% state of charge corresponds to the battery being empty and 100% state of charge corresponds to the battery being fully charged. However, the state of charge can also be expressed in other ways, for example such that 0% state of charge corresponds to the battery being fully charged and 100% state of charge corresponds to the battery being empty.

The user may be provided with information about the state of charge of the battery, as an example, a spoken indication, a visual signal, for example using a single- or multi-colored light emitting diode (LED) of the hearing instrument or the Charger. Using a single-colored LED for example, a flashing LED may indicate a lower state of charge, and a constantly lit LED may indicate a higher state of charge. Using a multi-colored as another example, one color, for example red, may indicate a lower state of charge, and another color, for example green, may indicate a higher state of charge. The user may be also provided with information about the state of charge of the battery, as another example, by a visual display of a charging system for charging the battery of the hearing instrument, the visual display displaying the state of charge as a percentage number. Furthermore, the user may be also provided with information about the state of charge of the battery, as yet another example, via a smartphone application which communicates with either the hearing instrument or a charging system for charging the battery of the hearing instrument. By providing the user of the hearing instrument with information about the state of charge of the battery, it is achieved that the user is able to recognize the state of charge of the battery, in particular while using the hearing instrument, or while charging the battery of the hearing instrument.

In the method according to the first aspect, providing the user of the hearing instrument with information about the state of charge of the battery may comprise providing the user of the hearing instrument with information indicating that the battery is fully charged when the open circuit voltage of the battery is lower than the charging voltage by a predetermined voltage difference. In other words, when charging the battery of the hearing instrument, the user may be informed about the charging process being finished when the open circuit voltage of the battery is lower than the charging voltage by a predetermined voltage difference. Due to a voltage drop between a charging circuit and the battery for example, the open circuit voltage of the battery might not reach the charging voltage during charging. Therefore, if the information indicating that the battery is fully charged was based solely on the open circuit voltage in relation to the charging voltage, this information may be inaccurate. Instead, by introducing a predetermined voltage difference, and providing the user of the hearing instrument with information indicating that the battery is fully charged when the open circuit voltage of the battery is lower than the charging voltage by this predetermined voltage difference, the accuracy of the information can be improved. In particular, the predetermined voltage difference takes into account the voltage drop between the charging circuit and the battery at the end of the charging procedure. Like this, the information indicating that the battery is fully charged is especially accurate.

In the method according to the first aspect, the battery may be a lithium-ion battery. Lithium-ion batteries are widely used in hearing instruments, and they are particularly sensitive to high charging voltages. Therefore, by charging a lithium-ion battery with the method according to the first aspect, the longevity of the lithium-ion battery can be improved considerably.

In the method according to the first aspect, determining the charging voltage may comprise determining the charging voltage between 1.0 V per cell and 4.6 V per cell, particularly between 3.6 V per cell and 4.4 V per cell, more particularly between 3.9 V per cell and 4.2 V per cell. Batteries of hearing instruments may comprise several battery cells, which may be connected in series. In this context, the above numbers refer to the voltage per cell. Determining the charging voltage between 3.3 V per cell and 4.6 V per cell, particularly between 3.6 V per cell and 4.4 V per cell, more particularly between 3.9 V per cell and 4.2 V per cell may be especially advantageous for certain battery types. In the case of lithium ion batteries for example, the maximum charge voltage is approximately 4.2 V per cell, and the voltage-of-no-stress is approximately 3.9 V per cell (depending on battery type and vendor). Therefore, by determining the charging voltage within the above-specified ranges, it can in this case be achieved that the charging voltage is always determined between the maximum charge voltage and the voltage-of-no-stress.

According to a second aspect, a charging system for charging a battery of a hearing instrument is disclosed. The charging system comprises means for performing a method according to the first aspect. In particular, the charging system comprises at least one battery, at least one charging circuit, at least one processor and at least one memory including computer program code, wherein the at least one memory and computer program code is configured to, with the at least one processor, cause the at least one charging system to at least perform a method according to the first aspect. By charging a battery of a hearing instrument using the charging system according to the second aspect, it may be achieved that battery longevity is improved while at the same time ensuring that a desired runtime capacity is provided.

According to a third aspect, a computer program product is disclosed. The computer program product comprises at least one non-transitory computer-readable storage medium including computer-executable program code, wherein the computer-executable program code comprises program code instructions configured to at least perform a method according to the first aspect. By charging a battery of a hearing instrument using the computer program product according to the third aspect, it may be achieved that battery longevity is improved while at the same time ensuring that a desired runtime capacity is provided.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the method and charging system are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Figure 1:
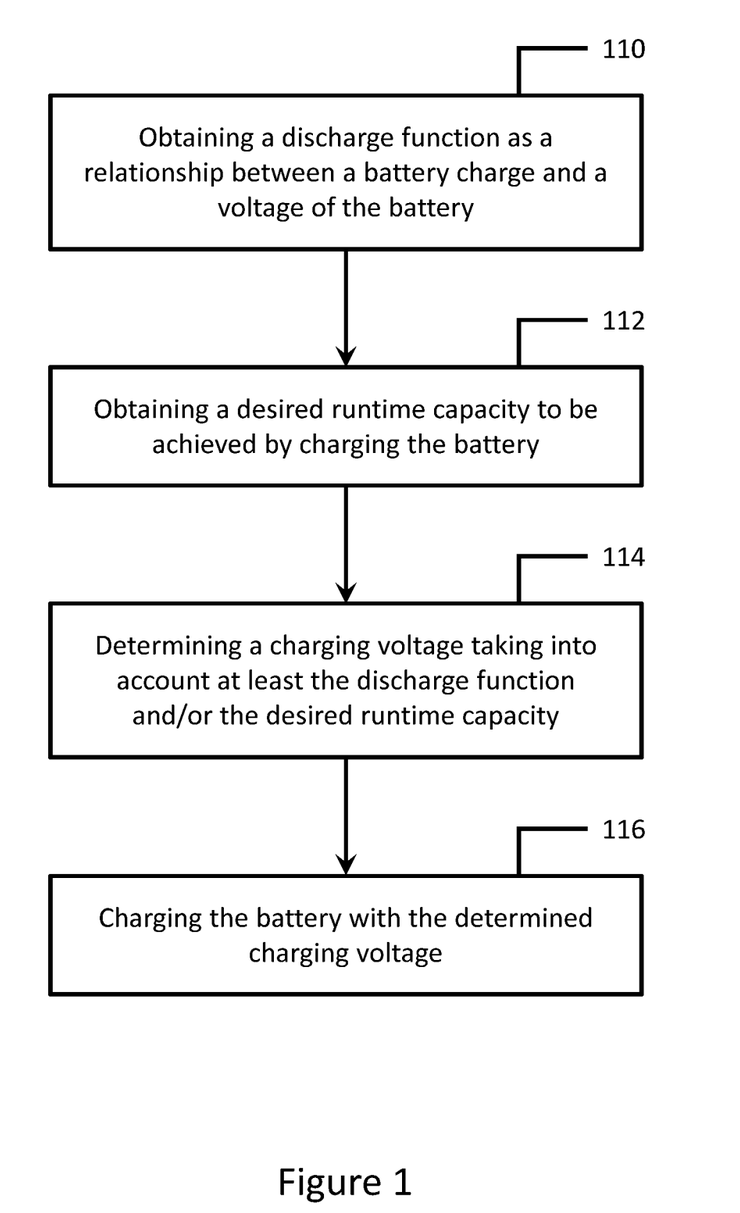
FIG. 1 is a flowchart illustrating operations performed in accordance with an exemplary embodiment of the first aspect of the present disclosure.

Now referring to FIG. 1, a flowchart illustrating operations performed in accordance with an exemplary embodiment of the method according to the first aspect of the present disclosure is shown. According to this embodiment, the method for charging a battery of a hearing instrument comprises:
- obtaining (110) a discharge function as a relationship between a battery charge and a voltage of the battery, such as an open circuit voltage of the battery, or a discharge voltage of the battery;
- obtaining (112) a desired runtime capacity to be achieved by charging the battery;
- determining (114) a charging voltage taking into account at least the discharge function and/or the desired runtime capacity;
- charging (116) the battery with the determined charging voltage.

Although the different elements are arranged in a particular order in the flowchart of FIG. 1, any reasonable way of performing the method, which is known to a person skilled in the art, and which may likewise result in a different order or no order at all, i.e. the different elements being for example performed simultaneously, is conceivable. Because the charging voltage determined in the exemplary embodiment of the method in FIG. 1 may be lower than a maximum charge voltage that is determined by the electrochemical processes occurring inside the battery, an improvement of battery longevity can be achieved.

In this context, a hearing instrument (or hearing device, hearing assistance device) may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing instrument" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user. The hearing instrument is adapted to be worn in any known way. This may include i) arranging a unit of the hearing instrument behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing instrument entirely or partly in the pinna and/or in the ear canal of the user such as in an In-the-Ear type hearing aid or In-the-Canal/Completely-in-Canal type hearing aid, or iii) arranging a unit of the hearing instrument attached to a fixture implanted into the skull bone such as in a Bone Anchored Hearing Aid or a Cochlear Implant, or iv) arranging a unit of the hearing instrument as an entirely or partly implanted unit such as in a Bone Anchored Hearing Aid or a Cochlear Implant. The hearing instrument may be implemented in one single unit (housing) or in a number of units individually connected to each other.

Figure 2:
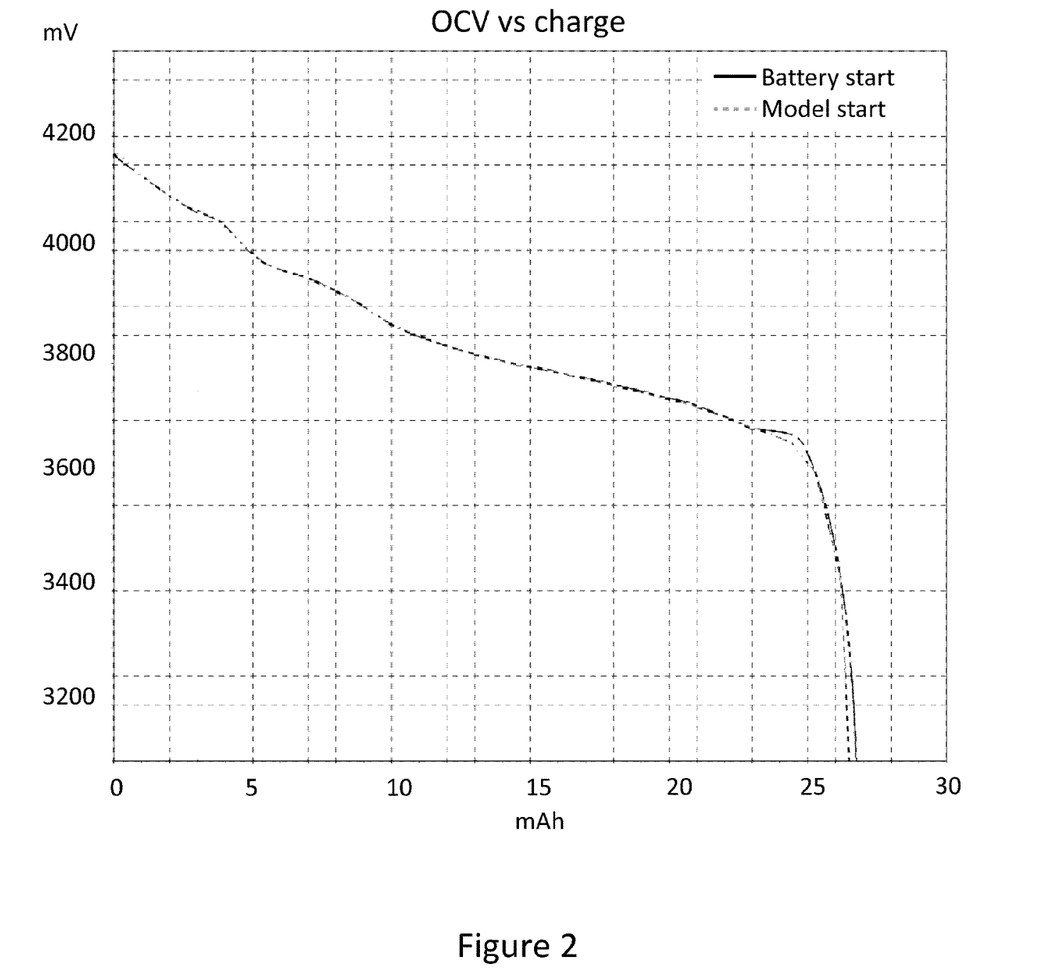
FIG. 2 is a graphical representation of two discharge functions showing both real data and model data of the open circuit voltage as a function of the battery charge for a battery in a factory-new state.

With respect to obtaining (110) a discharge function as a relationship between a battery charge and an open circuit voltage of the battery, FIG. 2 illustrates, referring to the curve labeled as 'Model start', a discharge function corresponding to a factory-new state of a battery. The abscissa of the diagram shows the battery charge, which is, in this example, defined to be equal to the electric charge withdrawn from the battery relative to the reference value zero, at which the battery is considered fully charged. Furthermore, the ordinate of the diagram shows the open circuit voltage, which is, in this example, defined to be equal to the battery voltage without electric load. As FIG. 2 shows, when the battery charge is zero, the open circuit voltage attains a maximum value of approximately 4180 mV when charged to 4200 mV. As the battery charge increases, the open circuit voltage reduces relative to the maximum value. Eventually, when the battery charge reaches a value of approximately 26.5 mAh, the open circuit voltage attains the shutdown voltage of approximately 3300 mV, where the discharge function falls rapidly. At this point, the battery is in an empty state and can no longer supply sufficient electric power without being recharged.

The exemplary embodiment of the method in FIG. 1 further comprises obtaining (112) a desired runtime capacity to be achieved by charging the battery and determining (114) a charging voltage taking into account at least the discharge function and/or the desired runtime capacity. As an example, using the discharge function of FIG. 2, curve 'Model start', and assuming a desired runtime capacity of 20 mAh, the charging voltage is determined as follows: The empty state of the battery, as mentioned above, corresponds to a battery charge of 26.5 mAh. Furthermore, if the battery is to be charged to the desired runtime capacity of 20 mAh, the battery charge after charging must be 26.5 mAh–20 mAh=6.5 mAh or less. The open circuit voltage corresponding to a battery charge of 6.5 mAh in the discharge function, which is approximately equal to the required charging voltage, is approximately 4000 mV determined by the 3980 mV plus the voltage difference between 4200 mV (charging voltage) and 4180 mV (the beginning of the curve). Therefore, the charging voltage is determined as approximately 4000 mV. Since the discharge function is bijective, it can easily be used to determine the required charging voltage to approximate the desired runtime capacity using simple linear interpolation.

The exemplary embodiment of the method in FIG. 1 further comprises charging (116) the battery with the determined charging voltage. As the above example shows, the charging voltage required to provide a runtime capacity of 20 mAh is approximately 4000 mV and therefore less than the maximum charge voltage of approximately 4200 mV. Thus, the exposure of the battery to high voltages can be reduced, and battery longevity can be improved. Nevertheless, the desired battery capacity of 20 mAh, which is large enough for the battery to provide enough electric power until the next regular recharging, is taken into account and provided, thus preventing unsatisfactory user experience by early battery depletion. This example shows that a particular advantage of the method according to the first aspect of the present disclosure is improving battery longevity while at the same time ensuring that a desired runtime capacity is provided.

The discharge function may be obtained in different ways. In an embodiment, the initial discharge function corresponding to a factory-new state of the battery (curve 'Model start' in FIG. 2) is stored in the hearing instrument during manufacturing. Besides that, obtaining the discharge function may comprise one or more of:
- obtaining the discharge function based on measurement data of the battery;
- obtaining the discharge function based on stored data of a sample battery;
- obtaining the discharge function based on a calculation model; and/or
- obtaining the discharge function with the aid of an artificial neuronal network which has been trained using training data.

Thereby, it is possible to obtain a discharge function that dynamically represents the ageing condition of the battery, which is advantageous in order to provide accurate information from the discharge function.

In other exemplary embodiments, the method of FIG. 1 comprises determining a battery capacity from the discharge function and using the determined battery capacity for determining the charging voltage. In embodiments, the battery capacity is determined as the difference between the battery charge corresponding to a predetermined maximum open circuit voltage in the discharge function and the battery charge corresponding to a predetermined shutdown voltage in the discharge function. Using again the discharge function of FIG. 2, curve 'Model start', as an example, the battery capacity determined like this is approximately 26.5 mAh, since the maximum open circuit voltage of approximately 4180 mV corresponds to a battery charge of zero, the shutdown voltage of approximately 3300 mV corresponds to a battery charge of approximately 26.5 mAh, and the difference between both battery charges is thus approximately 26.5 mAh. By determining the battery capacity as explained above, it is possible to reliably determine the battery capacity from the discharge function.

In exemplary embodiments of the method of FIG. 1, determining the charging voltage comprises:
- comparing the battery capacity and the desired runtime capacity;
- if the battery capacity is lower than or equal to the desired runtime capacity, setting the charging voltage to a predetermined maximum charging voltage;
- if the battery capacity is larger than the desired runtime capacity, setting the charging voltage to a value corresponding to the desired runtime capacity indicated by the discharge function.

Using again the discharge function of FIG. 2, curve 'Model start', corresponding to a battery capacity of 26.5 mAh as an example, and assuming again a desired runtime capacity of 20 mAh, since the battery capacity is larger than the desired runtime capacity, the charging voltage in this example is set to a value of approximately 3980 mV, corresponding to the desired runtime capacity and indicated by the discharge function, as explained above. Thereby, if the battery capacity is sufficiently large to provide the desired runtime capacity after charging, the charging voltage is set to a value such that the desired runtime capacity can be provided, while at the same time the battery is charged with a voltage smaller than the maximum charge voltage, thus improving battery longevity.

Figure 3:
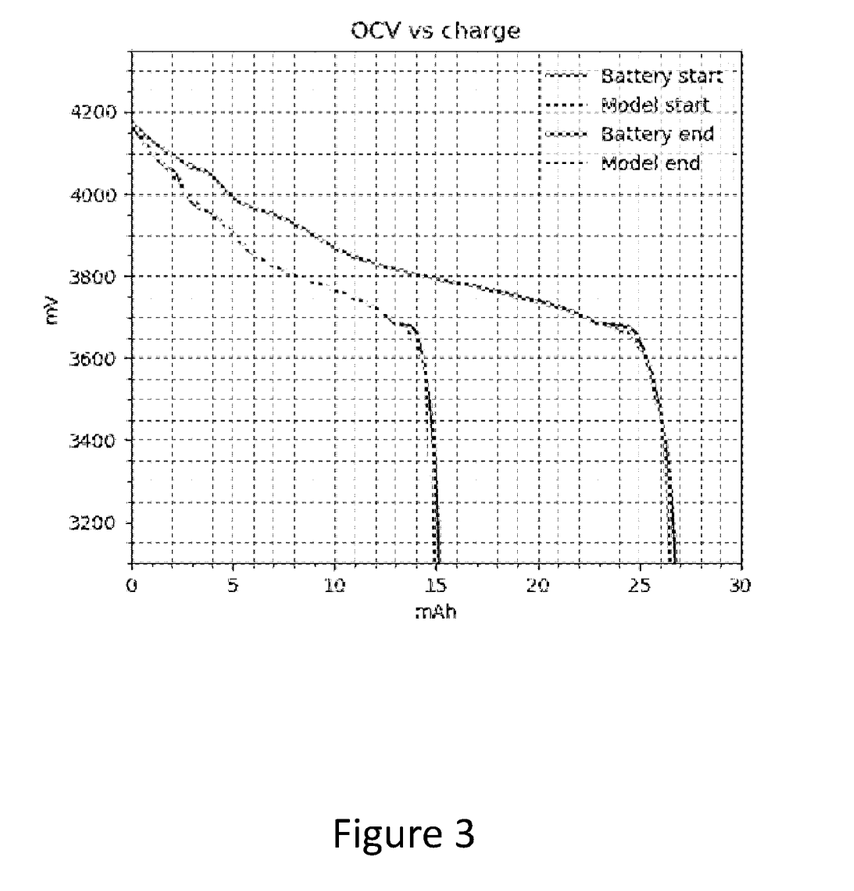
FIG. 3 is a graphical representation of four discharge functions showing both real data and model data of the open circuit voltage as a function of the battery charge, in each case both for a battery in a factory-new state and for a battery in a state at its end of life with reduced battery capacity.

However, the battery capacity may be lower than the desired runtime capacity, for example because of ageing of the battery, which reduces the battery capacity over time compared to the factory-new state. With respect to this, FIG. 3 illustrates, referring first to the curve labeled as 'Model start', again the discharge function corresponding to the factory-new state, and referring to the curve labeled as 'Model end', also the discharge function corresponding to a state of a battery at the end of its life having a reduced battery capacity. As FIG. 3 shows, the reduced battery capacity is only approximately 15 mAh. However, the maximum value of the open circuit voltage in the discharge function remains essentially constant. If now, as an example, a desired runtime capacity of 20 mAh is assumed again, since the battery capacity is in this case lower than the desired runtime capacity, the charging voltage in this example is set to a predetermined maximum charging voltage of approximately 4180 mV. This charging voltage is approximately equal to the above-mentioned maximum charge voltage and corresponds to the maximum battery capacity, in analogy to what has been explained above. Thereby, even though the actually resulting runtime capacity is in this case smaller than the desired battery capacity, the maximum possible capacity is provided, and therefore unsatisfactory user experience caused by early depletion of the battery is at least prevented to the largest possible extent.

In exemplary embodiments of the method of FIG. 1, the charging voltage is determined in the range between a predetermined maximum charging voltage and a predetermined minimum voltage-of-no-stress as a lower threshold where the voltage stress becomes insignificant. If the desired runtime capacity is already met at the voltage-of-no-stress, then there is no need to lower the battery charge further, and the runtime capacity will be higher than desired. On the other hand, if the runtime capacity cannot be met even with the highest possible charging voltage, then the actual runtime capacity will be lower than desired. In general there is a trade-off between selecting a high desired runtime capacity and the longevity of the battery since a higher charging voltage will provide higher runtime capacity but decrease longevity.

In exemplary embodiments of the method of FIG. 1, the method further comprises:
  repeatedly obtaining measurement data of the battery in order to update the discharge function;
  storing the updated discharge function;
  using a low pass filter for updating the discharge function, in particular an exponential moving average (EMA) filter.

In embodiments, the method may also comprise obtaining an updated discharge function and/or updating the discharge function. By obtaining an updated discharge function, updating the discharge function, or repeatedly obtaining measurement data of the battery in order to update the discharge function, it can be achieved in each case that the discharge function is continuously updated in order to dynamically represent the ageing condition of the battery, thus allowing to provide accurate information from the discharge function. By storing the discharge function, which has been updated like this, it can be achieved that the updated discharge function, which dynamically represents the ageing condition of the battery, is made available for a later use.

In embodiments, the stored discharge function is used to determine an up-to-date battery capacity. The up-to-date capacity is then in turn used in order to determine the minimum charging voltage that provides a desired runtime capacity, as explained above. Thereby, a good balance between providing the desired runtime capacity after charging and improving battery longevity can be achieved during the whole life span of the battery.

In embodiments, the discharge function is continuously measured only from the charged voltage level and below in order to update the discharge function. The missing data is added with the aid of an artificial neuronal network which has been trained using training data. Like this, the updated discharge function tracks the battery as the battery wears and trails of faster without requiring continuous measurement of the discharge function. In embodiments, since the battery only degrades slowly, and to provide protection against erroneous updates, the charging voltage is low-pass filtered using an EMA filter (or similar). Like this, voltage fluctuations, giving fluctuating runtime capacity are eliminated or at least reduced. Furthermore, the charging voltage may be limited in the range between a predetermined maximum charging voltage and a predetermined minimum voltage-of-no-stress.

Figure 4:
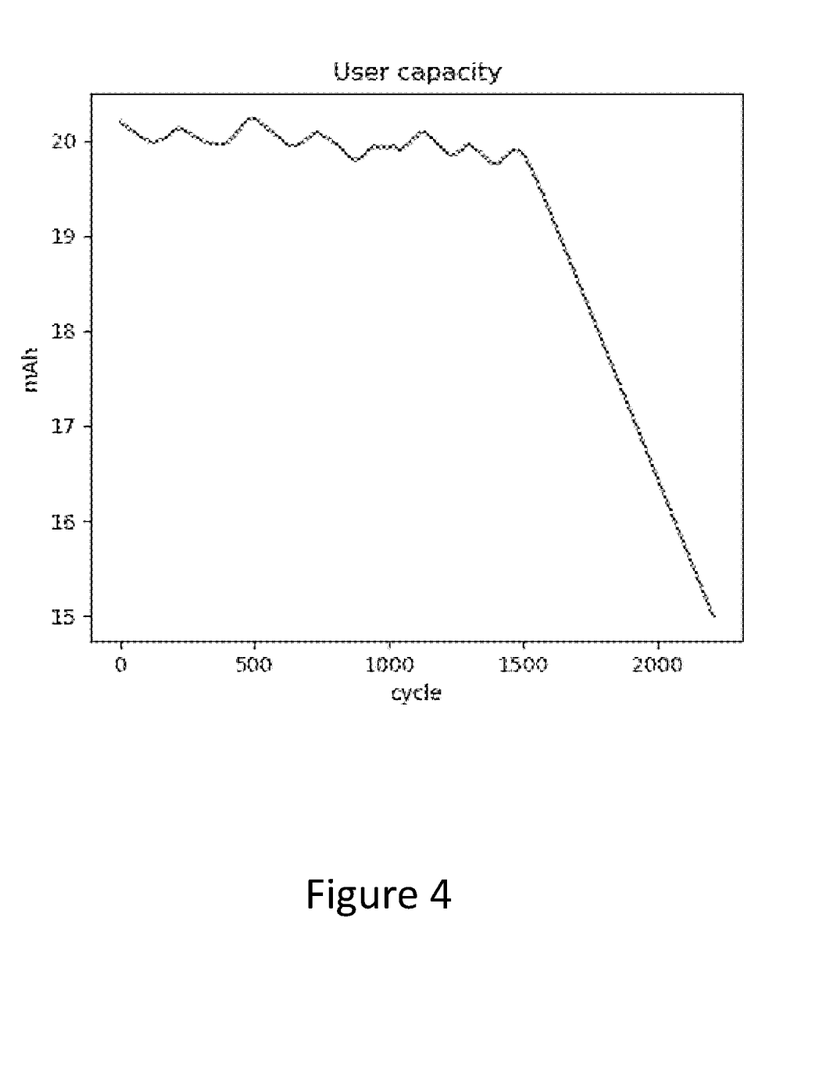
FIG. 4 shows an exemplary diagram of the runtime capacity of a battery, which can be achieved by performing operations in accordance with the first aspect of the present disclosure, as a function of user cycles.
Figure 5:
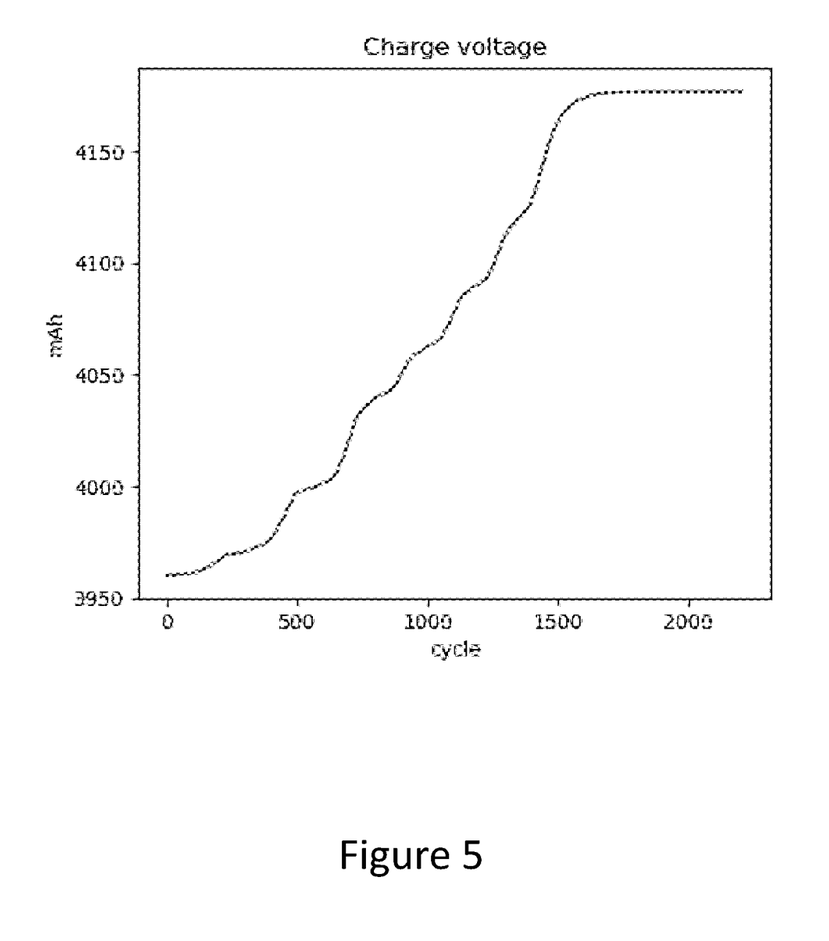
FIG. 5 shows an exemplary diagram of the charging voltage, which can be obtained by performing operations in accordance with the first aspect of the present disclosure, as a function of user cycles.

As the battery degrades over time, the charging voltage will need to increase in order to maintain a constant desired runtime capacity. As the charging voltage is increased, the discharge function for higher voltages will step-by-step be updated. Finally at some point, the charging voltage will reach approximately the maximum charge voltage, and from that point onwards, the actual runtime capacity will start to diminish below the desired value. These effects are illustrated in FIG. 4 and FIG. 5. Referring first to FIG. 4, which shows the actual runtime capacity as a function of user cycles, it can be recognised that the desired runtime capacity of 20 mAh in this example is maintained up to approximately 1500 use cycles of the battery. At this point, the battery capacity is no longer large enough to provide the desired runtime capacity, and the desired runtime capacity decreases up to a value of approximately 15 mAh at the end of the life span of the battery. Referring to FIG. 5, which shows the charging function as a function of user cycles, it can be recognized that the charging voltage (after charging) starting from approximately 3980 mV, reaches the maximum charge voltage (after charging) of approximately 4180 mV after approximately 1500 use cycles. After this point, the charging voltage does not increase further, because it is limited to a predetermined maximum charging voltage of approximately 4200 mV, corresponding approximately to the maximum charge voltage. FIG. 4 and FIG. 5 show that the desired runtime capacity of 20 mAh can be provided for a total of approximately 1500 user cycles. This is an improvement compared to conventional methods of charging a battery of a hearing instrument, where the charging voltage is always set to the maximum charge voltage of approximately 4200 mV, and where the end of life of the battery is typically already reached much faster. The increased life span of approximately 1500 user cycles, as shown by FIG. 4 and FIG. 5, is due to the exposure of the battery to high voltages being reduced, thus improving battery longevity.

In exemplary embodiments of the method of FIG. 1, obtaining the desired runtime capacity comprises obtaining the desired runtime capacity based on an action of the user of the hearing instrument. This gives the user the possibility to actively control the desired runtime capacity. A simple possibility to improve the longevity for users that rarely use the full runtime capacity is provided by allowing the user to set a flag if a state of charge below a certain threshold is reached. The charging voltage is then only adjusted upwards to increase runtime capacity if the flag is set. Some users may require a higher runtime capacity than the average user at the expense of lower longevity. In this case, the user may be provided with the possibility to adjust the value of the desired runtime capacity. A more advanced approach is to allow the user to raise the desired runtime capacity when required or to even automatically regulate the desired runtime capacity based on a learned usage pattern. However, in cases when the user requires a high runtime capacity, the effect of improved battery longevity may be lower.

In exemplary embodiments of the method of FIG. 1, the method further comprises providing the user of the hearing instrument with information about the state of charge of the battery. Thereby, it is achieved that the user is able to recognize the state of charge of the battery, in particular while using the hearing instrument, or while charging the battery of the hearing instrument. In embodiments, providing the user of the hearing instrument with information about the state of charge of the battery while charging comprises providing the user of the hearing instrument with information indicating that the battery is fully charged when the open circuit voltage of the battery is lower than the charging voltage by a predetermined voltage difference. This will make it possible to have a dynamically changing target charging voltage without affecting the indication of the state of charge to the user. Furthermore, it will also cover the case where the target charging voltage needs to be reduced due to high temperature. In embodiments, the predetermined voltage difference takes into account the voltage drop between the charging circuit and the battery at the end of the charging procedure. Like this, information indicating to the user that the battery is fully charged is especially accurate.

In exemplary embodiments of the method of FIG. 1, the battery is a lithium-ion battery. With respect to this, FIGS. 2 to 5 all refer to a lithium-ion battery, which are characterised by a maximum charge voltage determined by the electrochemical processes occurring inside the battery of approximately 4.2 V per cell, as can also be seen in FIG. 2 and FIG. 3. Lithium-ion batteries are widely used in hearing instruments, and since they are particularly sensitive to high charging voltages, their longevity can be improved considerably by charging them with the method according to the first aspect of the present disclosure.

In exemplary embodiments of the method of FIG. 1, the charging voltage is determined between 3.3 V per cell and 4.6 V per cell, particularly between 3.6 V per cell and 4.4 V per cell, more particularly between 3.9 V per cell and 4.2 V per cell. In some industrial lithium-ion batteries for example, it has been was found that, compared to the above-mentioned maximum charge voltage of approximately 4.2 V per cell, every reduction in peak charging voltage of 0.1 V per cell approximately doubles the number of use cycles before end of life. For example, a lithium-ion cell charged to 4.2 V typically delivers 300 to 500 cycles before reaching its end of life. If charged to only 4.1 V, the number of cycles can be increased to 600 to 1000 cycles; 4.0 V delivers 1200 to 2000 cycles, and 3.9 V provides 2400 to 4000 cycles. Furthermore, in terms of longevity, the optimal charging voltage is perhaps 3.9 V per cell (depends on battery type and vendor). This voltage has been found to correspond approximately to the voltage-of-no-stress, where all voltage-related stresses are eliminated. Therefore, determining the charging voltage within the above-specified ranges is especially advantageous in the case of lithium-ion batteries. Like this, the exposure of the lithium ion batteries to high voltages can be reduced, thus improving battery longevity.

Figure 6:
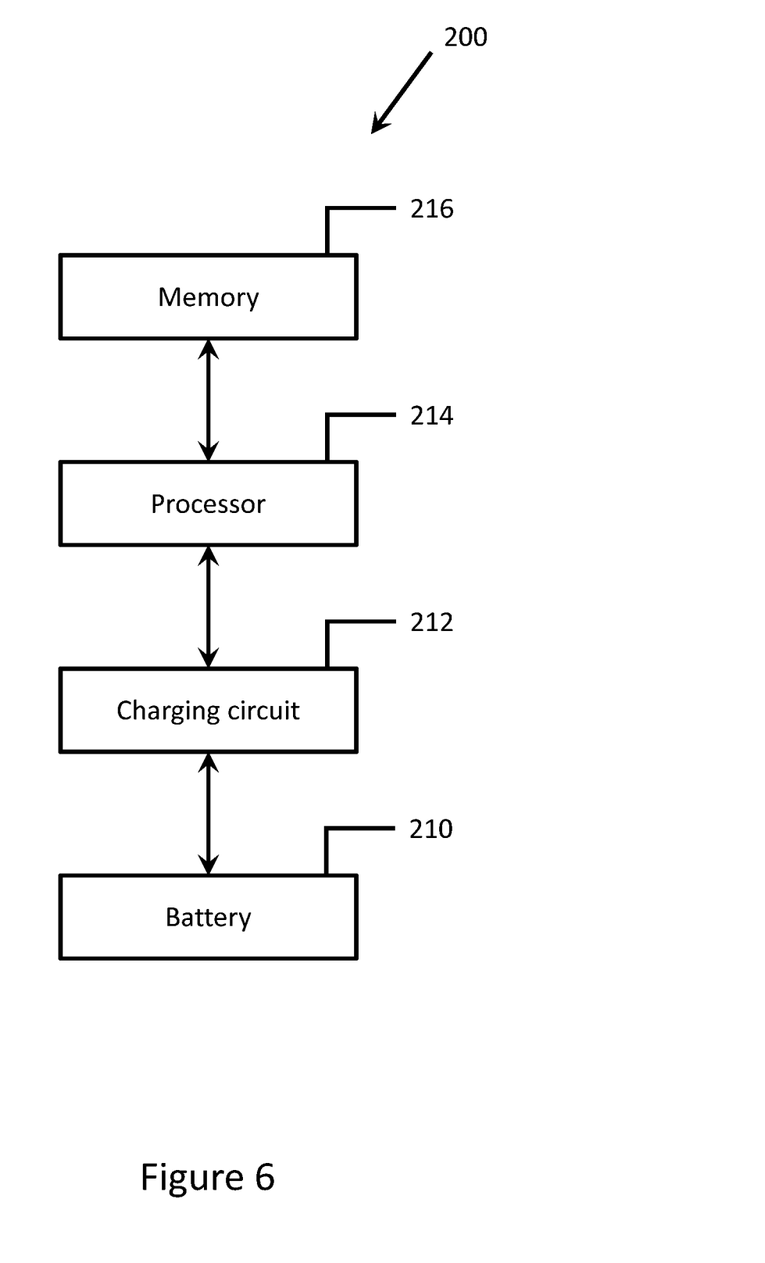
FIG. 6 is a block diagram of a charging system that may be specifically configured in accordance with an exemplary embodiment of the second aspect of the present disclosure.

In FIG. 6, an exemplary embodiment of a charging system (200) for charging a battery of a hearing instrument is shown. The charging system (200) comprises means for performing a method according to the first aspect of the present disclosure. More specifically, the charging system (200) comprises a battery (210), a charging circuit (212), a processor (214) and a memory (216) including computer program code, wherein the memory (216) and computer program code is configured to, with the processor (214), cause the charging system (200) to at least perform a method according to the first aspect of the present disclosure. By charging a battery of a hearing instrument using the charging system (200), it may be achieved that battery longevity is improved while at the same time ensuring that a desired runtime capacity is provided.

A computer program product comprising at least one non-transitory computer-readable storage medium including computer-executable program code, wherein the computer-executable program code comprises program code instructions configured to at least perform a method according to the first aspect of the present disclosure is furthermore provided by the present application. With respect to this, all relevant parts of the method may also be implemented in software.

In an aspect, parts or functions of the method may be stored on or encoded as one or more instructions or code on a tangible computer-readable medium. The computer-readable medium includes computer storage media adapted to store a computer program comprising program code instructions, which when run on a data processing system causes the data processing system to perform at least some (such as a majority or all) of the steps of the method described above and in the claims.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or by a data processing system. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

In an aspect, a data processing system comprises a processor adapted to execute the computer program for causing the processor to perform at least some (such as a majority or all) of the steps of the method described above and in the claims.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more". Unless specifically stated otherwise, the term "some" refers to one or more.

The invention claimed is:

1. A method for charging a battery of a hearing instrument, the method comprising:
   obtaining a discharge function as a relationship between a battery charge and a voltage of the battery;
   obtaining a desired runtime capacity to be achieved by charging the battery;
   determining a charging voltage taking into account at least the discharge function and/or the desired runtime capacity;
   charging the battery with the determined charging voltage.

2. The method according to claim 1, wherein obtaining the discharge function comprises one or more of:
   obtaining the discharge function based on measurement data of the battery;
   obtaining the discharge function based on stored data of a sample battery;
   obtaining the discharge function based on a calculation model; and/or
   obtaining the discharge function with the aid of an artificial neuronal network which has been trained using training data.

3. The method according to claim 1, the method further comprising:
   determining a battery capacity from the discharge function and using the determined battery capacity for determining the charging voltage.

4. The method according to claim 3, wherein determining the battery capacity comprises determining the battery capacity as the difference between the battery charge corresponding to a predetermined maximum voltage in the discharge function and the battery charge corresponding to a predetermined shutdown voltage in the discharge function.

5. The method according to claim 3, wherein determining the charging voltage comprises:
   comparing the battery capacity and the desired runtime capacity;
   if the battery capacity is lower than or equal to the desired runtime capacity, setting the charging voltage to a predetermined maximum charging voltage;
   if the battery capacity is larger than the desired runtime capacity, setting the charging voltage to a value corresponding to the desired runtime capacity indicated by the discharge function; or
   determining the charging voltage between a predetermined maximum charging voltage and a predetermined minimum voltage.

6. The method according to claim 1, wherein the method further comprises:
   obtaining an updated discharge function;
   updating the discharge function;
   repeatedly obtaining measurement data of the battery in order to update the discharge function;
   storing an updated discharge function; and/or
   using a low pass filter for updating the discharge function.

7. The method according to claim 1, wherein obtaining the desired runtime capacity comprises obtaining the desired runtime capacity based on an action of the user of the hearing instrument.

8. The method according to claim 1, the method further comprising:
   providing the user of the hearing instrument with information about the state of charge of the battery.

9. The method according to claim 8, wherein providing the user of the hearing instrument with information about the state of charge of the battery comprises providing the user of the hearing instrument with information indicating that the battery is fully charged when the voltage of the battery is lower than the charging voltage by a predetermined voltage difference.

10. The method according to claim 9, wherein the predetermined voltage difference takes into account the voltage drop between a charging circuit and the battery at the end of the charging procedure.

11. The method according to claim 1, wherein the battery is a lithium-ion battery.

12. The method according to claim 1, wherein determining the charging voltage comprises determining the charging voltage between 1.0 V per cell and 4.6 V per cell.

13. A charging system for charging a battery of a hearing instrument, the charging system comprising means for performing a method according to claim 1.

14. A charging system for charging a battery of a hearing instrument, the charging system comprising at least one battery, at least one charging circuit, at least one processor and at least one memory including computer program code, wherein the at least one memory and computer program code is configured to, with the at least one processor, cause the charging system to at least perform a method according to claim 1.

15. A computer program product comprising at least one non-transitory computer-readable storage medium including computer-executable program code, wherein the computer-executable program code comprises program code instructions configured to at least perform a method according to claim 1.

* * * * *